April 23, 1957 H. DOMSCH 2,789,434
ROTARY PISTON TYPE LIQUID METER
Filed March 13, 1952 4 Sheets-Sheet 1
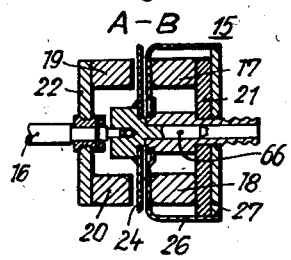
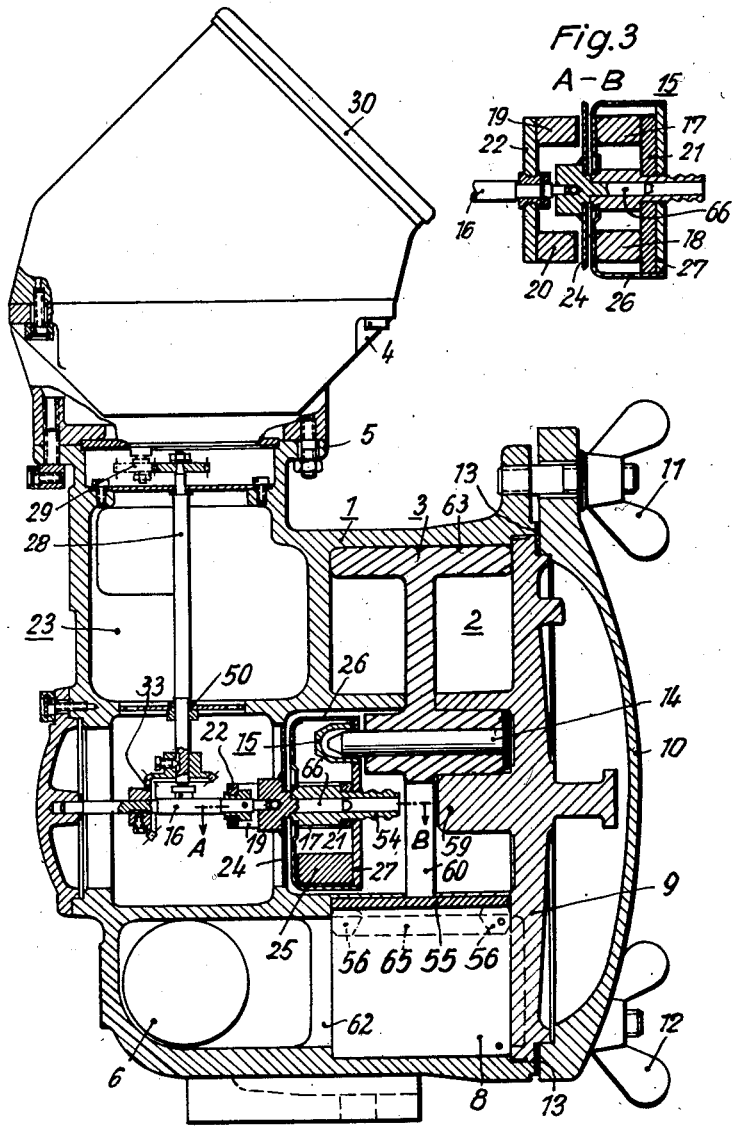
Inventor:
Hans Domsch.
By
Atty.

April 23, 1957 H. DOMSCH 2,789,434
ROTARY PISTON TYPE LIQUID METER
Filed March 13, 1952 4 Sheets-Sheet 3

Inventor:
Hans Domsch.

April 23, 1957  H. DOMSCH  2,789,434
ROTARY PISTON TYPE LIQUID METER
Filed March 13, 1952  4 Sheets-Sheet 4
Fig. 8
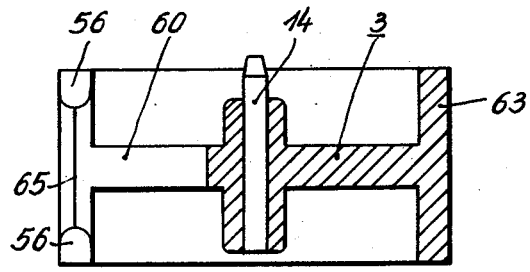
Fig. 9
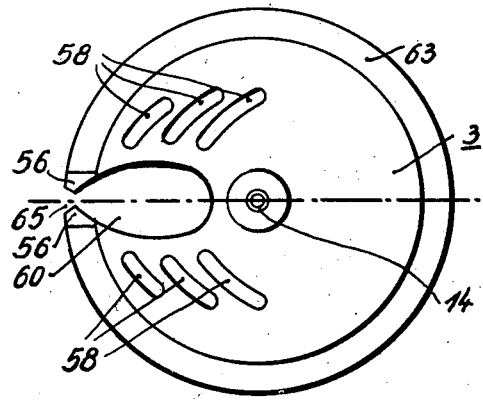
Fig. 10
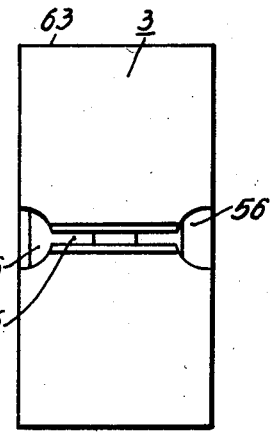
Inventor:
Hans Domsch.

United States Patent Office
2,789,434
Patented Apr. 23, 1957

2,789,434

ROTARY PISTON TYPE LIQUID METER

Hans Domsch, Berlin-Charlottenburg, Germany, assignor to Siemens & Halske Aktiengesellschaft, Munich, Germany, a German corporation Application March 13, 1952, Serial No. 276,334

Claims priority, application Germany April 12, 1951

2 Claims. (Cl. 73—257)

This invention is concerned with a rotary piston type device for metering liquids such as milk.

Known meters of this type are difficult to clean. They usually have a fixedly mounted potlike housing covered on top by a lid and provided with inlet and outlet means for the milk. Within the housing are provided special inner casing means forming a metering chamber in which is disposed the rotary type piston. The indicating mechanism is disposed on the lid.

The cleaning of such a milk meter requires a number of steps. The lid with the indicating mechanism must be removed first. The inner casing means forming the metering chamber is then removed and taken apart to clean its component parts. Cleaning of the remaining potlike housing is difficult because of its fixed mounting and because its opening faces upwardly. Residual milk contained in the housing therefore cannot be easily removed, for example, by tipping the housing. The required thorough cleaning of the housing prior to reinserting the separately cleaned metering chamber parts is thus made very difficult.

The object of the invention is to eliminate the drawbacks of prior milk meters of the type indicated above.

This object is realized by the provision of a meter having principal parts which are arranged as follows: The piston axis is disposed horizontally. The meter housing forms the metering chamber and the various parts thereof are correspondingly disposed. The inlet and outlet means are disposed at the lowest point of the meter housing and on the identical side of the metering chamber formed thereby. The inlet and outlet means are furthermore preferably disposed outside of or alongside the area covered by the metering chamber, so as to prevent distortion or buckling of the chamber parts by stresses put thereon incident to securing thereto the corresponding inlet and outlet pipes.

The piston is disposed for rotation in a vertical plane, its axis extending horizontally, and it is therefore necessary to balance it so that it can stop in any operating position instead of continuing the metering operation by unbalance due to its weight. This balancing is, according to the invention, carried out so as to provide for easy cleaning, by means of a counterweight and combining the counterweight in fluidtight manner with a magnetic coupling for the piston and the metering gear.

Another feature of the invention is concerned with forming the passages required in the connecting wall between the peripheral annular rim of the piston and the piston pivot in slotlike manner or in the form of holes. Only relatively few holes or slotlike passages need be provided to facilitate the cleaning.

In accordance with still another feature, the axis of the part of the meter housing which carries the indicating mechanism is displaced relative to the piston axis at an angle of 90°. The housing for the indicating mechanism can thus be arranged in any desired position relative to the housing for the metering chamber; that is, the lid for the metering chamber and the scale for the indicating mechanism need not be on a certain or on the same side of the meter.

The new meter comprising the features indicated above meets all operating requirements and all environmental operating conditions.

An embodiment of the invention will now be described with reference to the drawings, in which Fig. 1 shows an example of the new meter partly in elevational and partly in sectional representation;

Fig. 3 illustrates the magnetic coupling in section, taken approximately along line A—B of Fig. 1;

Figs. 8 to 10 show three views of a rotary piston similar to the one shown in Figs. 4 to 6 but provided with slotlike passages.

Figure 2:
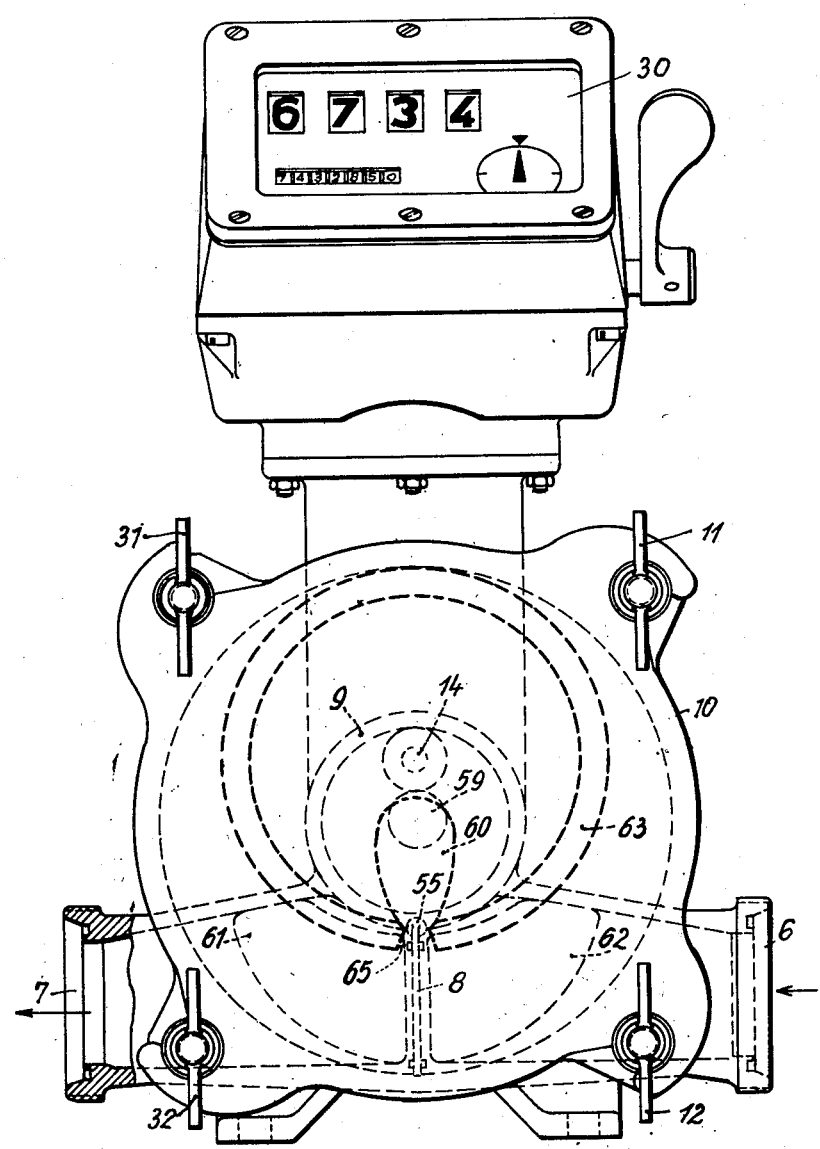
Fig. 2 is an elevational view of the meter as seen from the right of Fig. 1.

Numeral 1 indicates the meter housing which is a unitary structure forming chambers as shown, including the inlet or metering chamber 62 and the outlet or discharge chamber 61, extending along opposite sides of a partition 8 as particularly indicated in Fig. 2, such chambers accommodating the piston 3. The indicating mechanism 4 is secured on the housing 1 at 5. There is an inlet 6 and an outlet 7. Between the inlet and outlet is provided the partition wall 8. The metering chamber 62, formed by the unitary housing, is closed by a cover 9, and adjacent thereto is disposed an outer lid 10 which is fastened by wing nuts 11, 12, 31 and 32. A gasket 13 is provided to hold the outer lid 10 liquidtight relative to the cover 9 and corresponding walls of the housing 1.

The piston pivot shaft 14 is disposed horizontally and extends into a recess 15 provided in a wall of the driving portion of a magnetic coupling at one side thereof. The pivot 14 is secured centrally of the piston 3 and therefore moves in accordance with the piston motion. The piston 3 executes within the metering chamber a motion along a certain curve, due to being slotted at 65 as shown in Fig. 2 and particularly in Figs. 4 to 6, this slotted part sliding up and down along the partition wall 8, while the pivot executes a circular motion relative to the boss 59 which extends inwardly from the cover 9. The motion of the piston is particularly apparent from Fig. 7. The pivot shaft 14 moves incident to the piston rotation around the boss 59 extending inwardly from the cover 9 and the slot 65 glides thereby up and down along the partition wall 8. The wall 8 has a thickened portion 55 which engages the wall of the piston cutout 60 in sliding engagement therewith. The pivot shaft 14 therefore executes a circular motion with a radius from its axis to the axis of the fixed boss 59. The axis of the boss 59 coincides with the axis of the magnetic coupling and with the axis of the bearing pin 66 (for the driving portion of the coupling) which is secured to a partition 24, and the driving portion of the magnetic coupling therefore follows the motion of the piston pivot 14 and rotates the driving portion of the magnetic coupling.

The recess in the magnetic coupling which is engaged by the inner end of the pivot shaft 14 is not visible in the view of the coupling as shown in Fig. 3, because this view is displaced by 90° relative to Fig. 1. As will be apparent from Fig. 3, the magnetic coupling comprises two pairs of magnets 17—18 and 19—20 which are respectively interconnected by the iron bars 21, 22. The magnets 17, 18 rotate with the pivot shaft 14, and such rotation is magnetically transmitted to the magnets 19, 20. Both parts of the magnetic coupling therefore rotate identically. The riffled member 54 extending from the driving portion of the coupling serves as a handle for removing this portion from the bearing pin 66 for cleaning purposes.

The partition 24 is provided for separating in liquidtight manner the metering chamber 62 from the interior of the housing portion 23 which contains the drive gear for the indicating mechanism. At the bottom of the housing portion 23 are disposed the inlet and outlet means 6 and 7.

For balancing the piston 3 there is provided a counterweight 25 which is disposed in the driving portion of the magnetic coupling on one side of the bearing pin 66, the recess engaged by the pivot shaft 14 being on the opposite side of the bearing pin 66. The counterweight and the magnets 17, 18 are in liquidtight manner enclosed in a casing formed by a cup and plate 27. The whole unit is rotatable on and removable from the bearing pin 66 which extends from the bearing mounted on the partition 24.

Figure 7:
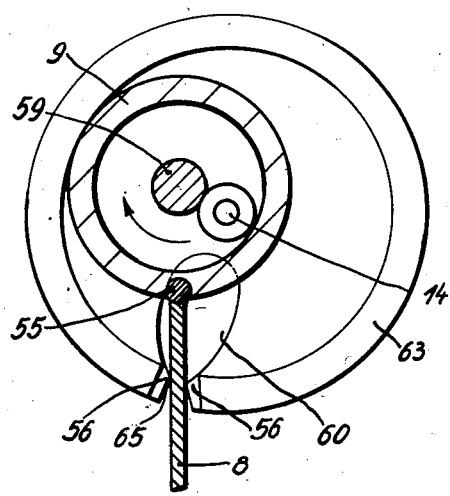
Fig. 7 is a diagram to aid in explaining the motion of the piston.

The counterweight 25 is required for counteracting the tendency of the piston to rotate by inertia whenever its pivot shaft 14 is disposed to the left or to the right of the median center line, for example, when it is disposed to the right of the median center line as shown in Fig. 7. The piston is in this manner balanced and thus conditioned to come to rest in any angular position thereof.

The magnetic coupling transmits the rotation of the piston shaft 14 to a shaft 16 carrying the driven parts (magnets 19—20) thereof. The shaft 16 in turn rotates the gear 33 and therewith the shaft 28 which is journalled at 50, and hence over the gear 29 the indicating mechanism 4 which shows the metering results on its face 30.

Figure 4:
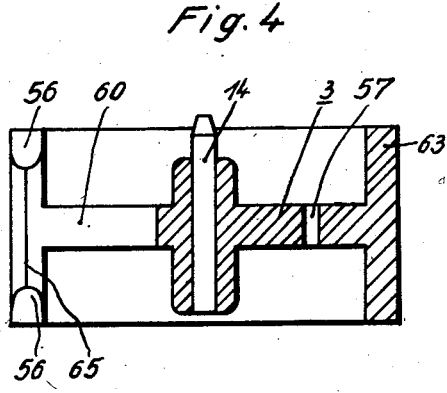
Figs. 4 to 6 show three views of the rotary piston provided with passages in the form of holes.
Figure 5:
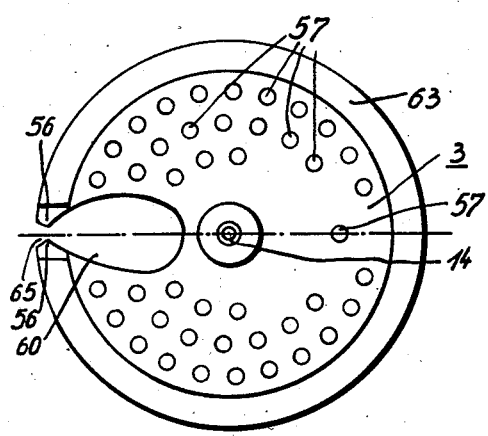
Figure 6:
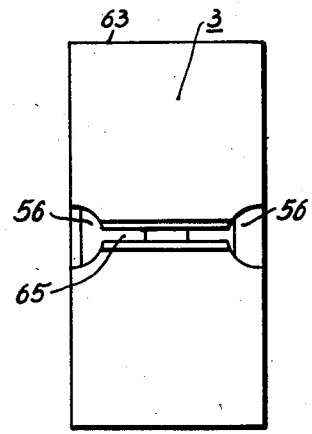

The piston 3 comprises in one embodiment an outer annular rim 63 which is slotted at 65 as is particularly apparent from Figs. 4 to 6. The piston is also provided with passages 57 in the transverse wall extending between the outer rim 63 and the pivot 14, and also with recesses 56 on either side of the slot 65. The liquid enters from the inlet 6 into the chamber 62 (Figs. 1 and 2) and flows through the passages 57 into the measuring chamber, causing rotation of the piston, moving thereafter through the passages 57 and the outlet discharge chamber 61 (Fig. 2) to the outlet 7. The recesses 56 permit the liquid to escape in the terminal positions of the piston quickly to the outlet side. The cutout 60 in the piston permits up-and-down displacement thereof along the partition 8 guided by the piston slot 65 as explained before, particularly with reference to Fig. 7. The enlargement 55 on the partition wall 8 provides for fluidtight operation in all positions of the slotted piston relative to the partition 8. The enlargement 55 is shown in Fig. 1 in section, while the partition 8 is indicated in elevation.

The piston shown in Figs. 8–10 is similar to the one described in the preceding paragraph except that slotlike passages 58 are provided in place of the holes 57 shown in connection with the piston according to Figs. 4–6.

Changes may be made within the scope and spirit of the appended claims.

I claim:

1. A rotary piston type meter for liquids such as milk and the like comprising a housing, a vertically extending first partition in said housing, one side of said first partition forming the inner wall of a measuring chamber and the other side thereof forming the inner wall of a gear chamber, said first partition having an opening formed therethrough, a member for sealing said opening to separate said gear chamber liquidtight from said measuring chamber, bearing means carried by said member for journalling therein a driven shaft extending horizontally into said gear chamber, a stationary stub shaft extending horizontally from said member into said measuring chamber, a first removable cover forming the outer wall of said measuring chamber, a second cover, means for removably fastening said second cover over said first cover to secure said first cover in place so as to seal said measuring chamber liquidtight to the outside, a horizontally extending second partition forming respectively the bottom wall of said gear chamber and the top wall of a bottom chamber disposed below said gear chamber and laterally offset relative to said measuring chamber, inlet means for liquid extending from one end of said bottom chamber and outlet means extending from the other end thereof, third vertically disposed partition means extending from said bottom wall and subdividing said bottom chamber into an inlet chamber communicating with said inlet and an outlet chamber communicating with said outlet, both said inlet and said outlet chamber communicating with said measuring chamber at the bottom thereof, a rotary piston having a peripheral rim and a central horizontally extending hub interconnected by a transverse wall, means in said first cover for rotatably journalling said hub to dispose said piston for rotation in a vertical plane extending through said measuring chamber, passages being formed in the transverse wall of said piston to establish communication respectively from said inlet chamber on both sides of said piston to said measuring chamber and from said measuring chamber on both sides of said piston to said outlet chamber, gear means in said gear chamber coupled with said driven shaft, an indicating mechanism disposed on top of said gear chamber and geared to said gear means, magnetic driving means rotatably disposed on said stationary stub shaft and coupled for rotation with said piston, magnetic drive means on said driven shaft cooperating with said magnetic driving means for the purpose of rotating said driven shaft to drive said gear means so as to actuate said indicating mechanism, and a counterweight carried by said driving means for balancing said piston so as to cause it to come to rest in any angular position thereof.

2. A rotary piston type meter for liquids such as milk and the like comprising a housing, a vertically extending first partition in said housing, one side of said first partition forming the inner wall of a measuring chamber and the other side thereof forming the inner wall of a gear chamber, said first partition having an opening formed therethrough, a member for sealing said opening to separate said gear chamber liquidtight from said measuring chamber, bearing means carried by said member for journalling therein a driven shaft extending horizontally into said gear chamber, a stationary stub shaft extending horizontally from said member into said measuring chamber, a first removable cover forming the outer wall of said measuring chamber, a second cover, means for removably fastening said second cover over said first cover to secure said first cover in place so as to seal said measuring chamber liquidtight to the outside, a horizontally extending second partition forming respectively the bottom wall of said gear chamber and the top wall of a bottom chamber disposed below said gear chamber and laterally offset relative to said measuring chamber, inlet means for liquid extending from one end of said bottom chamber and outlet means extending from the other end thereof, third vertically disposed partition means extending from said bottom wall and subdividing said bottom chamber into an inlet chamber communicating with said inlet and an outlet chamber communicating with said outlet, both said inlet and said outlet chamber communicating with said measuring chamber at the bottom thereof, a rotary piston having a peripheral rim and a central horizontally extending hub interconnected by a transverse wall, means in said first cover for rotatably journalling said hub to dispose said piston for rotation in a vertical plane extending through said measuring chamber, passages being formed in the transverse wall of said piston to establish communication respectively from said inlet chamber on both sides of said piston to said measuring chamber and from said measuring chamber on both sides of said piston to said outlet chamber, gear means in said gear chamber coupled with said driven shaft, an indicating mechanism disposed on top of said gear chamber and geared to said gear means, magnetic driving means rotatably disposed on said stationary stub shaft and coupled for rotation with said piston, magnetic driven means on said driven shaft cooperating with said magnetic driving means for the purpose of rotating said driven shaft to drive said gear means so as to actuate said indicating mechanism, and a counterweight carried by said driving means for balancing said piston so as to cause it to come to rest in any angular position thereof, said magnetic driving means comprising a liquidtight casing rotatably disposed on said stub shaft and magnet means in said casing rotatable therewith.

References Cited in the file of this patent

UNITED STATES PATENTS

| | | |
|---|---|---|
| 300,628 | Nash | June 17, 1884 |
| 387,831 | Thomson | Aug. 14, 1888 |
| 514,171 | Thomson | Feb. 6, 1894 |
| 1,189,348 | Costello | July 4, 1916 |
| 1,574,338 | Bradley | Feb. 28, 1926 |
| 2,338,609 | Whittaker | Jan. 4, 1944 |
| 2,487,783 | Bergman | Nov. 15, 1949 |

FOREIGN PATENTS

| | | |
|---|---|---|
| 527,269 | Great Britain | Oct. 4, 1940 |
| 629,331 | Great Britain | Sept. 16, 1949 |